US006292974B1

(12) United States Patent
Merkel et al.

(10) Patent No.: US 6,292,974 B1
(45) Date of Patent: Sep. 25, 2001

(54) GLASS WIPER BLADE FOR MOTOR VEHICLES

(75) Inventors: Wilfried Merkel, Kappelrodeck; Wolfgang Leutsch; Thomas Kotlarski, both of Buehlertal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,398

(22) PCT Filed: Jul. 9, 1998

(86) PCT No.: PCT/DE98/01893

§ 371 Date: Jun. 11, 1999

§ 102(e) Date: Jun. 11, 1999

(87) PCT Pub. No.: WO99/10211

PCT Pub. Date: Mar. 4, 1999

(30) Foreign Application Priority Data

Aug. 21, 1997 (DE) ........................................ 197 36 368

(51) Int. Cl.[7] ............................ B60S 1/38; B60S 1/40

(52) U.S. Cl. ............................ 15/250.201; 15/250.43

(58) Field of Search ..................... 15/250.201, 250.43, 15/250.44, 250.361, 250.48, 250.451, 250.32

(56) References Cited

U.S. PATENT DOCUMENTS 3,088,155 * 5/1963 Smithers .
3,317,945 * 5/1967 Ludwig .
3,418,679 * 12/1968 Barth et al. .
3,879,793 * 4/1975 Schlegel .
5,546,627 * 8/1996 Chen .

FOREIGN PATENT DOCUMENTS 1 247 161 1/1970 (DE) .
2311293 * 9/1974 (DE) ................................ 15/250.43
2336271 * 2/1975 (DE) .
2440179 * 11/1975 (DE) ................................ 15/250.43
316114 * 5/1989 (EP) .
2199302 * 4/1974 (FR) .
1429820 * 3/1976 (GB) ................................ 15/250.43

* cited by examiner

*Primary Examiner*—Gary K. Graham
(74) *Attorney, Agent, or Firm*—Michael J. Striker

(57) ABSTRACT

A wiper blade (10) is proposed that serves to clean windows of motor vehicles. The wiper blade has an elongated, rubber-elastic wiper strip (14) which can be placed against the window to be wiped and is disposed substantially longitudinally axially parallel to one face, that is, the face oriented toward the window, of a striplike, spring-elastic support element (12), which is connected to a wiper arm (18) that is driven crosswise to the length of the wiper blade and can be urged toward the window. Even at high vehicle speeds, a requisite wiper blade contact pressure for attaining a swept field clean enough to meet legal requirements is achieved if the wiper blade (10) is provided with a leading-edge face (36 or 60), which extends longitudinally of the wiper blade and substantially parallel to the window and faces into the wind (arrow 38), and which crosswise to its length forms an acute angle with the window.

8 Claims, 1 Drawing Sheet

16 20 24 18 12 10 26 III 32 22 14 III 28
54 36 52 38 32 30 40 34 10 12 14 28 26 25

10
12
14
16
18
20
22
24
25
26
28
30
32
34
36
38
40
42
50
52
54
56
60
III
α

GLASS WIPER BLADE FOR MOTOR VEHICLES

BACKGROUND OF THE INVENTION

The present invention relates to a wiper blade for windows of motor vehicles.

In wiper blades the support element is meant to assure the evenest possible distribution of the wiper blade contact pressure on the windows, over the entire swept field swept by the wiper blade. By means of a suitable curvature of the unstressed support element—that is, when the wiper blade is not applied to the wiper blade—the ends of the wiper strip, which in wiper blade operation is pressed entirely against the window, are urged toward the window by the then-stressed support element, even if the radii of curvature of spherically curved vehicle windows differ in every position of the wiper blade. The curvature of the wiper blade must accordingly be somewhat greater than the greatest curvature measured in the swept field of the window to be wiped. The support element thus replaces the complicated support bracket construction, having two spring rails disposed in the wiper strip, of the kind employed in conventional wiper blades.

The invention takes as its point of departure a wiper blade of this type. In a known wiper blade of this type (German Patent DE-PS 12 47 161), the wiper blade, or its support element, which for reasons of distributing the contact pressure protrudes far past the wiper strip in the middle region of the wiper blade, can on the one hand be engaged from below, on the front side facing into the wind, with an attendant buildup of overpressure, by this overpressure. On the other hand, on the back side facing away from the wind, because of the structural form noted above, a considerable negative pressure builds up. Although the wiper blade, which during operation usually executes a pendulum motion, constantly changes its position relative to the oncoming relative wind, even then one of its long sides is always more or less greatly exposed to the wind and is therefore called the front side, while its other long side is accordingly also thought of as the back side. At relatively high vehicle speeds, given the cooperation of these two aforementioned pressures, both of which are oriented counter to the wiper blade contact pressure, this contact pressure is reduced at least enough that proper wiping is no longer possible. Increasing the wiper blade contact pressure against the window at high vehicle speeds could admittedly reduce the severity of this problem, but at lower vehicle speeds, when the liftoff tendency is less, the friction between the wiper blade and the window increases; this leads to undesirable noise buildup and to excessively high stress on the drive components and on the rubber of the wiper.

SUMMARY OF THE INVENTION

It is therefore an object of the present invention to provide a wiper blade which avoids the disadvantages of the prior art.

In keeping with these objects, one feature of present invention, resides, briefly stated, in a wiper blade provided with a leading-edge face which extends longitudinally over the wiper blade and substantially parallel to the window and faces into the wind, and which crosswise to its length forms an acute angle with the window.

In the wiper blade of the invention, via the leading-edge face that faces into the wind, a force component aimed at the window is built up, which counteracts the liftoff tendency of the two pressures and thus assures excellent cleaning quality, at least in the region of the swept field swept by the wiper blade, that is, the region that is important to the vehicle's driver. Depending on the size of the leading-edge face and/or on the size of the approach angle $\alpha$, this auxiliary contact pressure can be adapted to the variable demands that depend on the type of vehicle. It is also advantageous in the arrangement of the invention that as a function of the vehicle speed, the contact pressure rises or falls with this speed. Thus a suitably "high auxiliary contact pressure" is opposed only to the liftoff tendency that occurs at high speed.

A compact wiper strip is obtained if the leading-edge face is disposed on the face of the support element facing away from the window. The auxiliary contact pressure is then distributed not in point form but areally, over the entire length of the wiper blade.

The embodiment of a leading-edge face can advantageously by attained in that it is embodied on a separate, elongated component that is solidly joined to the support element.

A simple structure of such a separate component is obtained in that, seen in cross section, it has at least approximately the shape of a triangle, one side of which contacts the face of the support element facing away from the window, and also that the leading-edge face is embodied on another side of the triangle. In certain cases, it can be advantageous to equip the leading-edge face at least partially with a hollow curvature facing into the wind.

Securing the component to the one side of the support element is achieved economically by a glued connection. So that the distribution of the contact pressure effected by the support element will not be impaired, the component is made from a rubber-elastic material whose hardness is no greater, and is preferably less, than the hardness of the rubber-elastic wiper strip. Advantages in terms of production are attained if the component is made from a suitable plastic.

The length, and the width and height projected in the operating direction of the wiper blade, of the leading-edge face is designed to suit the requirements. In certain cases it is expedient if the leading-edge face extends at least nearly over the entire length of the wiper blade.

Further advantageous refinements and features of the invention are recited in the ensuing description of an exemplary embodiment shown in the accompanying drawing.

DESCRIPTION OF THE PREFERRED EMBODIMENT

Figures 1, 2, 3, 4:
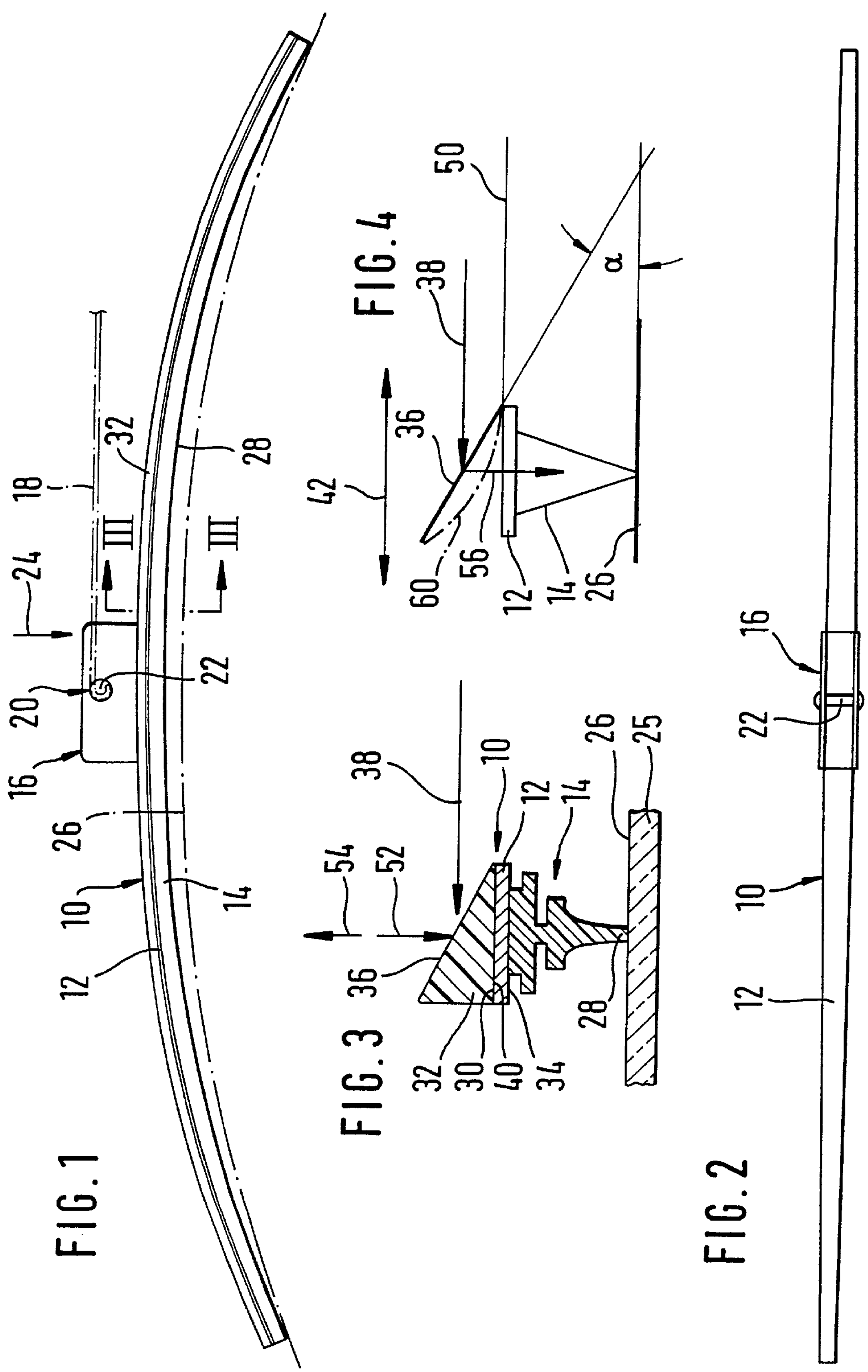
FIG. 1 shows a side view of a wiper blade of the invention.
FIG. 2 shows a plan view on the wiper blade of FIG. 1.
FIG. 3 shows a section through the wiper blade, taken along the line III—III in FIG. 1 and shown on a larger scale in schematic form.
FIG. 4 shows a basic illustration of the wiper blade of FIG. 3.

A wiper blade 10 shown in FIGS. 1 and 2 has a single- or multi-part, elongated, spring-elastic support element 12, to whose underside an elongated, rubber-elastic wiper strip 15 is secured longitudinally axially parallel to it. A connection device 16 is disposed on the top side of the support element, and with its aid the wiper blade 10 can be detachably connected to a driven wiper arm 18. A hook acting as a counterpart connection means is formed onto the free end 20 of the wiper arm 18 and grasps a pivot pin 22 that belongs to the connection device 22 of the wiper blade. The securing between the wiper arm 18 and the wiper blade 10 is taken on by securing means not shown in further detail but known per se and embodied as adapters. The wiper arm 18 and thus also the hook on the end 20 of the arm is urged in the direction of the arrow 24 toward the window to be wiped, whose surface to be wiped is suggested in FIG. 1 by a dot-dash line 26. Since the dot-dash line 26 is meant to represent the greatest curvature of the window surfaces, it is quite apparent that the curvature of the wiper blade 10, which rests with its two ends on the window, is greater than the maximum curvature of the window. Under the contact pressure (arrow 24), the wiper blade presses with its wiper lip 28 over its entire length against the window surface 26. This causes a tension to build up in the bandlike, spring-elastic support element 12, and this tension assures a proper contact of the wiper strip 14 or wiper lip 28, over their entire length, with the motor vehicle window.

The particular design of the wiper blade 10 will be described in further detail, especially in terms of FIGS. 3 and 4. On the upper face 30 of the bandlike support element 12, facing away from the windshield 25, a single- or multiple-part component 32 extending longitudinally of the wiper blade 10 is secured; it is made from a rubber-elastic material, preferably a plastic, whose hardness is less than the hardness of the rubber-elastic wiper strip 14. This wiper strip 14 is disposed on the lower face 34, toward the window 25, of the support element 12. As FIG. 1 shows, the component 32 extends over the entire length of the wiper blade 10. It has a cross section in the shape of a triangle or wedge (FIG. 3). In the exemplary embodiment, to that end, the shape of a non-isosceles triangle has been selected. The longest side 36 of this triangle forms a leading-edge face for the relative wind created by the motor vehicle, which is symbolized by the arrow 38 in FIG. 3. A second, shorter side 40 of the triangular shape faces toward the upper face 30 of the support element 12. The two faces, facing one another, of the support element 12 and 40 of the component 32 are joined together by gluing.

To explain the mode of operation of the wiper blade of the invention, see FIG. 4, in which all the necessary parts of the wiper blade are shown in basic form. During operation of the wiper blade, whose operating motion is represented by the double arrow 42 when the wiper blade is displaced with its wiper strip 14 over the surface 26 of the window, the support element 12 is located in a plane that extends substantially parallel to the surface 26 of the window. The wiper blade 10 then experiences a contact pressure 52 (FIG. 3) that is countered during wiper blade operation, especially at high vehicle speeds, by a liftoff tendency acting in the direction of the arrow 54 in FIG. 4. Since the leading-edge face 36 of the component 30 facing into the wind 38, and forms an acute angle a with the surface 26 of window 25, the pressure of the relative wind 38 generates a force component that is represented in FIG. 4 by the arrow 56. This force component 56 acts counter to the liftoff tendency (arrow 54) in FIG. 3 and thus keeps the contact pressure (arrow 52) within the legally prescribed range. In a departure from the exactly triangular cross-sectional shape shown in FIG. 3 for the component 12, this component can also be embodied such that its side facing into the wind 38 is provided with a hollow curvature 60, which is represented in FIG. 4 by a dot-dash line. But even with the provision of a hollow curvature on the side toward the wind 38, the component 30 maintains its basically triangular cross-sectional shape and thus also the possibility of the development of a force component (arrow 56 in FIG. 4) from the contact pressure with which the wind (arrow 38) meets the curved leading-edge face 60.

What is claimed is:

1. A wiper blade for windows of motor vehicles, comprising a curved, band-shaped, spring-elastic support element which distributes a pressure applied by a wiper arm and has a concave and a convex surface which defines corresponding planes; an elongated rubber-elastic wiper strip placeable on a window to be wiped and mounted to said concave surface of said support element which faces the window, substantially longitudinally parallel to said concave surface; a connection device provided for a wiper arm and arranged directly on a convex side of said support element; and a component which is separate from said wiper strip and is mounted directly to the convex surface of said support element so as to form a leading-edge face extending in a longitudinal direction of the support element and forming, as seen crosswise to its longitudinal extension, an acute angle with a plane which extends parallel to a plane formed by said convex surface.

2. A wiper blade as defined in claim 1, wherein said leading-edge face is disposed on a face of said support element which faces away from the window.

3. A wiper blade as defined in claim 1, wherein said leading-edge face is formed as a separate elongated component which is solidly joined to said support element.

4. A wiper device as defined in claim 3, wherein said component, seen in a transverse cross-section, has at least approximately a shape of a triangle with one side contacting a face of said support element facing away from the window, and said leading-edge face being formed on another side of said triangle.

5. A wiper device as defined in claim 3, wherein said component is glued to the one side of said support element.

6. A wiper device as defined in claim 3, wherein said component is composed of a rubber-elastic material with a hardness which is no greater than a hardness of said rubber-elastic wiper strip.

7. A wiper device as defined in claim 3, wherein said component is composed of plastic.

8. A wiper blade as defined in claim 1, wherein said leading-edge face extends at least nearly over an entire length of the wiper blade.

* * * * *

UNITED STATES PATENT AND TRADEMARK OFFICE

CERTIFICATE OF CORRECTION

PATENT NO. : 6,292,974 B1
APPLICATION NO. : 09/284398
DATED : September 25, 2001
INVENTOR(S) : W. Merkel et al.

It is certified that error appears in the above-identified patent and that said Letters Patent is hereby corrected as shown below:

Title Pg., Item (75), after “Buehlertal” delete “,all of (DE)” and substitute --; Friedrich Don, Waiblingen, all of (DE)--

Signed and Sealed this

Second Day of September, 2008

JON W. DUDAS
*Director of the United States Patent and Trademark Office*